United States Patent [19]
Huang

[11] Patent Number: 5,697,700
[45] Date of Patent: Dec. 16, 1997

[54] HANDY LASER POINTER

[75] Inventor: Chaochi Huang, Taiwan, Taiwan

[73] Assignee: Quarton Inc., Taipei, Taiwan

[21] Appl. No.: 784,997

[22] Filed: Jan. 17, 1997

[51] Int. Cl.$^6$ ................................................ F21K 7/00
[52] U.S. Cl. ............................ 362/259; 362/84; 362/109
[58] Field of Search ........................... 362/84, 109, 118, 362/259; 250/463.1

[56] References Cited

U.S. PATENT DOCUMENTS

| | | | |
|---|---|---|---|
| 4,546,419 | 10/1985 | Pemberton | 362/84 |
| 5,193,897 | 3/1993 | Halsey | 362/118 |
| 5,343,376 | 8/1994 | Huang | 362/259 |

*Primary Examiner*—Stephen F. Husar
*Attorney, Agent, or Firm*—Morton J. Rosenberg; David I. Klein; Jun Y. Lee

[57] ABSTRACT

A handy laser pointer including a cylindrical cassing coated with a layer of phosphorescent substance and having a transverse through hole, a laser firing cap fastened to the front end of the casing by plugging, a rear end cap fastened to the rear end of the casing by a screw joint and having a hanging hole for hanging, an insulative sleeve mounted inside the casing, a laser module holder mounted inside the casing and abutted against the insulative sleeve, a battery set mounted in the insulative sleeve and connected to the rear end cap, and a laser module mounted inside the casing and fastened to the laser module holder, the laser module including a circuit board fastened to the laser module holder and having a switch, a laser generator connected to the circuit board and controlled by the switch to emit a laser beam through the laser firing cap, a button mounted in the transverse through hole of the casing and adapted for switching the switch, a metal spring connected between the circuit board and the battery set.

18 Claims, 6 Drawing Sheets

HANDY LASER POINTER

BACKGROUND OF THE INVENTION

The present invention relates to laser pointers, and more particularly to a handy laser pointer which is easy to disassemble and reassemble without any tools, and has means convenient for carrying.

A variety of laser pointers have been disclosed for pointing things out on a map, blackboard, screen, etc., and have appeared on the market. These laser pointers commonly have a rotary switch for operation control, and a clip coupled to the a rotary switch for fastening. These laser pointers are complicated to assemble. When a part of the laser module is damaged, it is difficult to make a replacement. When not in use, a laser pointer user tends to fasten the laser pointer to the pocket or a part of the clothes by the clip. However, when the clip cannot firmly secure the laser pointer in place, and the laser pointer may fall from the pocket or clothes when the user bends the body. Because the clip is fastened to the rotary switch, the switch circuit tends to be damaged when fastening the clip to the pocket or a part of the clothes.

SUMMARY OF THE INVENTION

The present invention has been accomplished to provide a handy laser pointer which eliminates the aforesaid drawbacks. It is one object of the present invention to provide a handy laser pointer which is easy to disassemble and reassemble without any tools. According to one aspect of the present invention, the handy laser pointer is comprised of a cylindrical casing, a laser firing cap and a rear end cap respectively fastened to both ends of the casing, an insulative sleeve mounted inside the casing to hold a set of battery, a laser module mounted inside the casing and controlled by a press button switch to emit a laser beam through the laser firing cap, and a module holder mounted inside the casing and abutted against the insulative sleeve to hold the laser module, wherein the laser firing cap is detachably fastened to the casing by plugging; the rear end cap is detachably fastened to the casing by a screw joint. According to another aspect of the present invention, the laser pointer has a rear projecting rod, and a hanging hole at the rear projecting rod for hanging a key ring or the like. According to still another aspect of the present invention, the casing has a plurality of recessed portions (or raised portions) spaced around the periphery and coated with a layer of phosphorescent substance for night operating.

DETAILED DESCRIPTION OF THE PREFERRED EMBODIMENT

Figure 1:
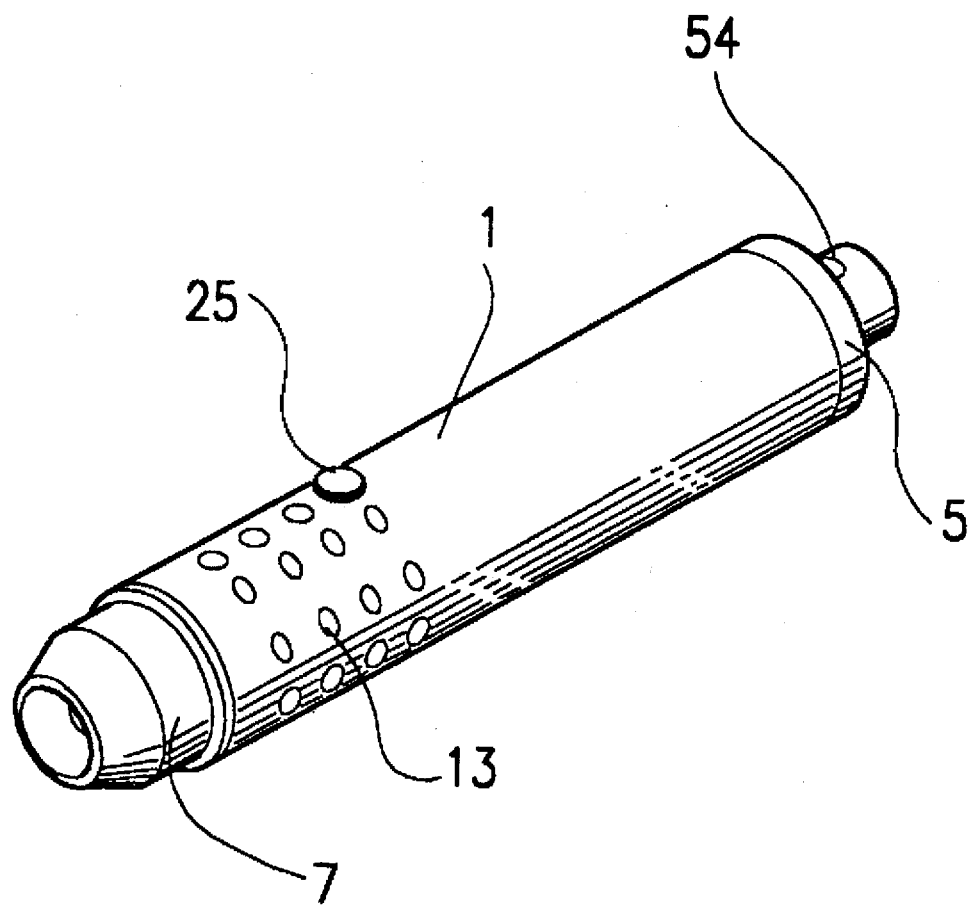
FIG. 1 is an elevational view of a handy laser pointer according to a first embodiment of the present invention.
Figure 2:
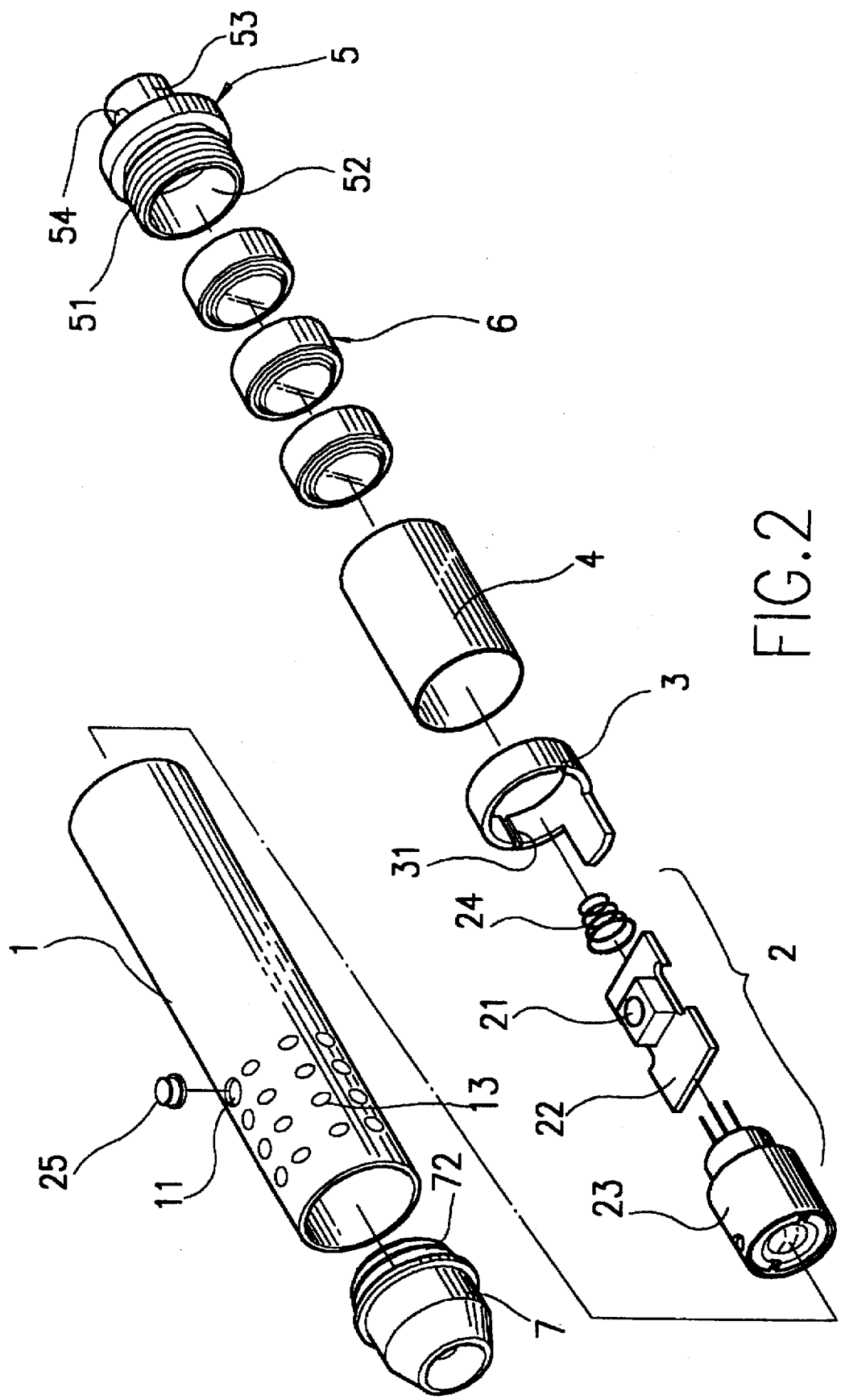
FIG. 2 is an exploded view of the handy laser pointer shown in FIG. 1.
Figure 3:
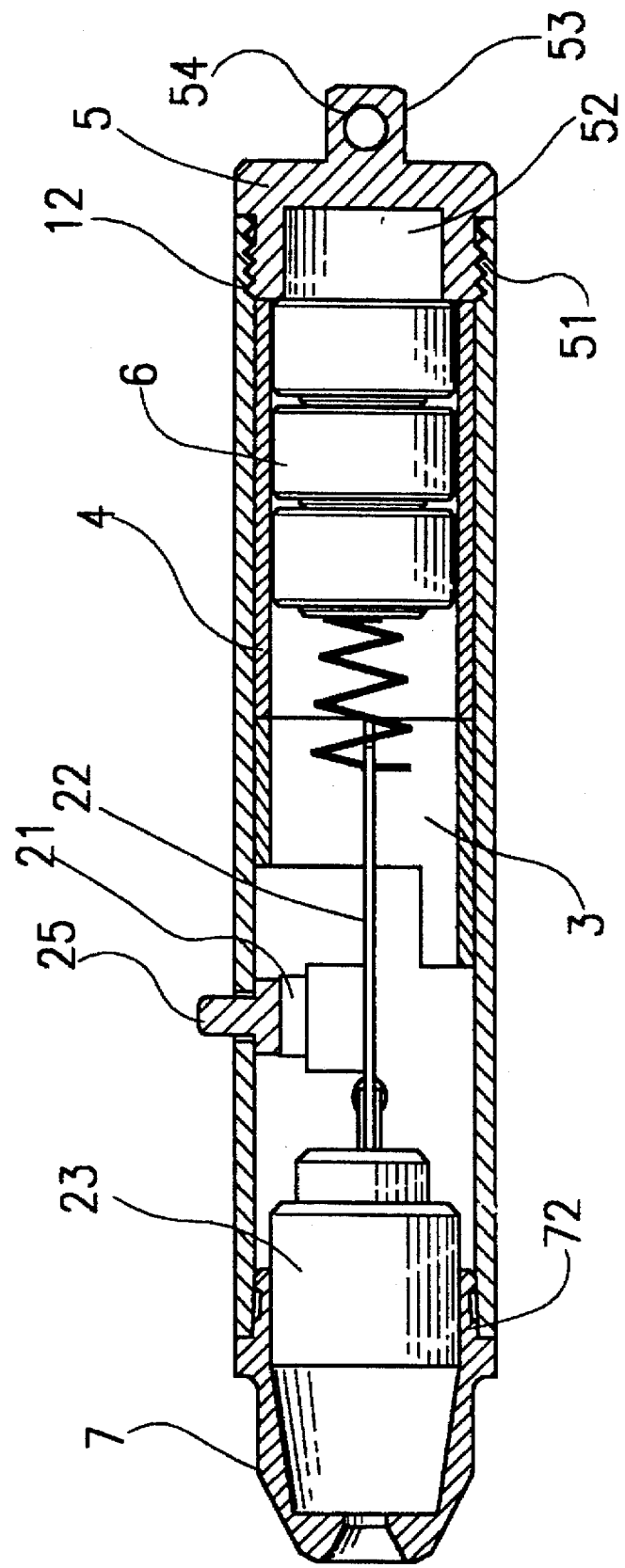
FIG. 3 is a longitudinal view in section in an enlarged scale of FIG. 1.
Figure 4:
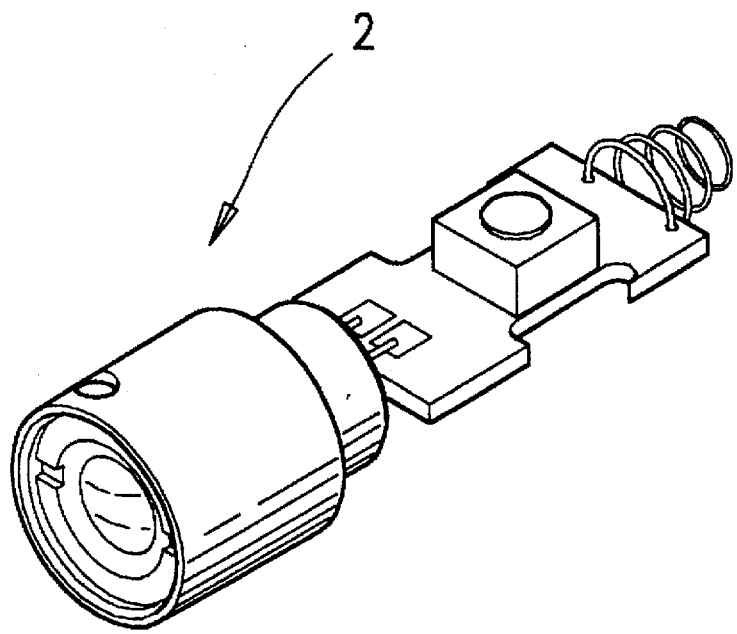
FIG. 4 is an elevational assembly view of the laser module of the handy laser pointer shown in FIG. 2.
Figure 5:
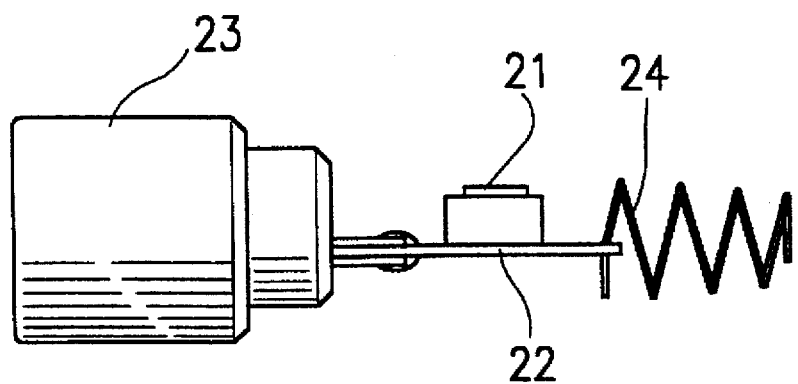
FIG. 5 is a side view of FIG. 4.

Referring to FIGS. from 1 to 5, a handy laser pointer in accordance with one embodiment of the present invention, is generally comprised of a cylindrical casing 1, a laser module 2, a laser module holder 3, an insulative sleeve 4, a rear end cap 5, a battery set 6, and a laser firing cap 7. The casing 1 having a plurality of recessed portions 13 on the outside, a transverse through hole 11 at a suitable location, and an inner thread 12 at one end, namely, the rear end. The laser module 2, the laser module holder 3, the insulative sleeve 4, and the battery set 6 are respectively mounted within the casing 1. The laser module 2 is comprised of a switch 21, a circuit board 22, a laser generator 23, a metal spring 24, and a button 25. The laser generator 23 is connected to the circuit board 22. The switch 21 is mounted on the circuit board 22, and controlled by the button 25, which is mounted in the through hole 11 of the casing 1. The laser module holder 3 has a cylindrical shape, two longitudinal locating grooves 31 oppositively disposed on the inside. The longitudinal edges of circuit board 22 is fastened to the longitudinal locating grooves 31 inside the laser module holder 3, having one end connected to the metal spring 24. The metal spring 24 has one end connected to one end of the circuit board 22, and an opposite end contacted to one end of the battery set 6. The insulative sleeve 4 is mounted within the casing 1 to hold the laser module holder 3, the metal spring 24, and the battery set 6 on the inside. The rear end cap 5 comprises a cap body 52 having an outer thread 51 threaded into the inner thread 12 of the casing 1 and disposed in contact with one end (opposite to the metal spring 24) of the battery set 6, and a projecting rod 53 longitudinally raised from one end of the cap body 52 and having a hanging hole 54 for hanging a key ring or the like. The laser firing cap 7 has a conical coupling section 72 fitted into one end of the casing 1. When assembled, the negative terminal of the battery set 6 is connected to the metal spring 24, and the positive terminal thereof is connected to the rear end cap 5. When the button 25 is depressed, the switch 21 is forced to switch on the circuit of the circuit board, thereby causing the battery power supply of the battery set 6 to be transmitted to the laser generator 23, and therefore the laser generator 23 is triggered to emit a laser beam through the laser firing cap 7. Further, the casing 1, the rear end cap 5 and the laser firing cap 7 may be coated with a layer of phosphorescent substance or directly made from material containing phosphorescent substance, or the recessed portions 13 of the casing 1 may be coated with a layer of phosphorescent substance.

Figure 6:
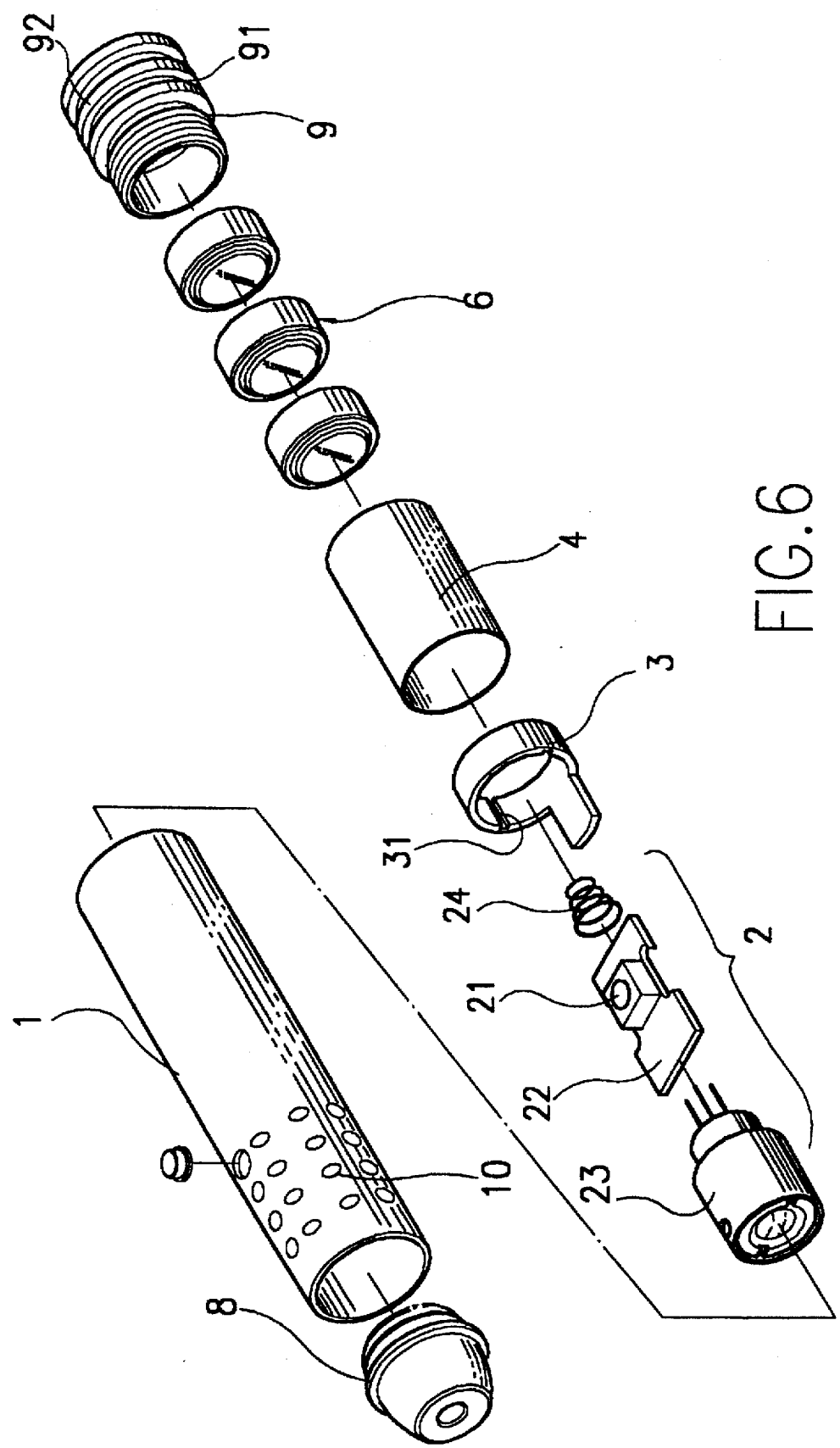
FIG. 6 is an exploded view of a laser pointer according to a second embodiment of the present invention.
Figure 7:
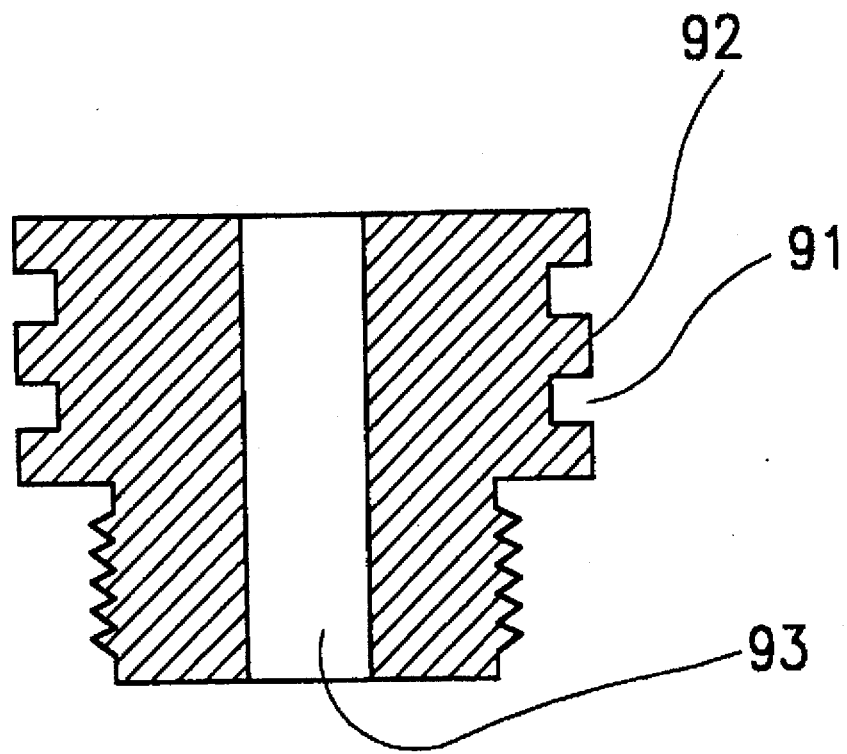
FIG. 7 is a sectional view of the rear end cap of the handy laser pointer shown in FIG. 6.

FIGS. 6 and 7 show an alternate form of the present invention. This alternate form is comprised of a cylindrical casing 1, a laser module 2, a laser module holder 3, an insulative sleeve 4, a battery set 6, a laser firing cap 8, and a rear end cap 9. According to this alternate form, the laser firing cap 8 is similar to the aforesaid first embodiment, but has a different shape; the casing 1 has a plurality of raised portions 10 raised around the periphery; the rear end cap 9 has three annular flanges 91 raised around the periphery and two annular groove 92 defined between the annular flanges 91 for coating the layer of phosphorescent substance therein, and a rear wire hole 93 for mounting a carrying rope or the like; the casing 1, the rear end cap 9 and the laser firing cap 8 may be coated with a layer of phosphorescent substance or directly made from material containing phosphorescent substance, or the raised portions 10 of the casing 1 may be coated with a layer of phosphorescent substance.

It is to be understood that the like reference signs designate like parts through out the annexed drawings; the drawings are designed for the only purposes to illustrate preferable embodiments of this invention which are easy to disassemble and reassemble, and are not intended as a definition of the limits and scope of the invention disclosed.

What the invention claim is:

1. A handy laser pointer of easy disassembly comprising:

a cylindrical casing having a front end, a rear end, an inner thread at said rear end, and a transverse through hole;

a laser firing cap fastened to the front end of said cylindrical casing by plugging and defining a laser firing hole;

a rear end cap fastened to the rear end of said cylindrical casing, said rear end cap having an outer thread threaded into said inner thread of said cylindrical casing;

an insulative sleeve mounted inside said cylindrical casing and spaced between said laser firing cap and said rear end cap;

a laser module holder mounted inside said cylindrical casing and abutted against one end of said insulative sleeve, having two longitudinal locating grooves oppositively disposed on the inside;

a battery set mounted in said insulative sleeve and having one end connected to said rear end cap; and a laser module mounted inside said cylindrical casing and fastened to said laser module holder and controlled to emit a laser beam through said laser firing hole of said laser firing cap, said laser module comprising a circuit board fastened to said longitudinal locating grooves of said laser module holder and having a switch, a laser generator connected to said circuit board and controlled by said switch to emit a laser beam through said laser firing hole of said laser firing cap, a button mounted in said transverse through hole of said cylindrical casing and adapted for switching said switch, a metal spring having a front end connected to said circuit board, and a rear end contacted to one end of said battery set remote from said rear end cap.

2. The handy laser pointer of claim 1 wherein said cylindrical casing has a plurality of recessed portions spaced around the periphery.

3. The handy laser pointer of claim 2 wherein said recessed portions of said cylindrical casing are coated with a layer of phosphorescent substance.

4. The handy laser pointer of claim 1 wherein said cylindrical casing has a plurality of raised portions raised around the periphery.

5. The handy laser pointer of claim 4 wherein the raised portions of said cylindrical casing are coated with a layer of phosphorescent substance.

6. The handy laser pointer of claim 1 wherein said rear end cap has a projecting rod disposed outside said cylindrical casing, said projecting rod having a hanging hole for hanging.

7. The handy laser pointer of claim 1 wherein said rear end cap has a rear wire hole for mounting a carrying rope.

8. The handy laser pointer of claim 1 wherein the laser firing hole of said laser firing cap is a taper hole.

9. The handy laser pointer of claim 1 wherein said insulative sleeve is a rounded tube.

10. The handy laser pointer of claim 1 wherein said insulative sleeve is a rectangular tube.

11. The handy laser pointer of claim 1 wherein said cylindrical casing is made from material containing phosphorescent substance.

12. The handy laser pointer of claim 1 wherein said cylindrical casing is peripherally coated with a layer of phosphorescent substance.

13. The handy laser pointer of claim 1 wherein said button is made from material containing phosphorescent substance.

14. The handy laser pointer of claim 1 wherein said button is coated with a layer of phosphorescent substance.

15. The handy laser pointer of claim 1 wherein said laser firing cap is made from material containing phosphorescent substance.

16. The handy laser pointer of claim 1 wherein said laser firing cap is peripherally coated with a layer of phosphorescent substance.

17. The handy laser pointer of claim 1 wherein said rear end cap is made from material containing phosphorescent substance.

18. The handy laser pointer of claim 1 wherein said rear end cap is coated with a layer of phosphorescent substance.

* * * * *